Dec. 24, 1940.                G. E. ROWE                2,226,504
                METHOD OF FORMING HOLLOW GLASS ARTICLES
                        Filed Feb. 23, 1938
Fig.1.            Fig.2.            Fig.3.
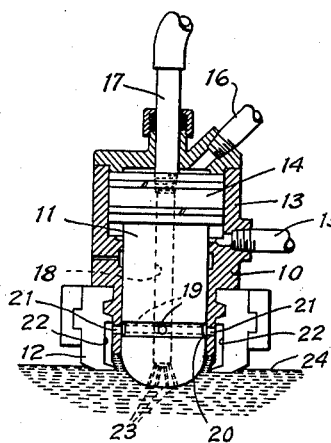 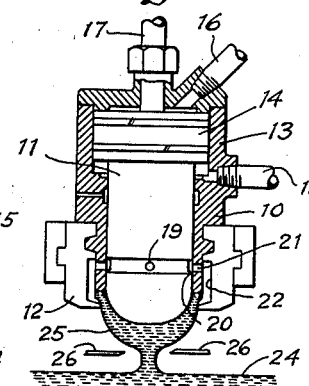 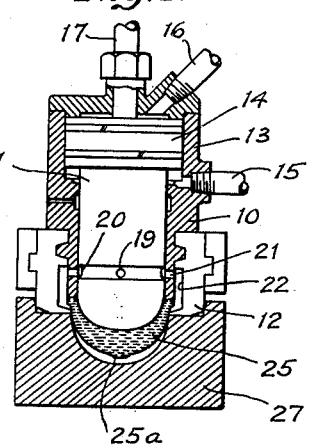
Fig.4.            Fig.5.            Fig.6.
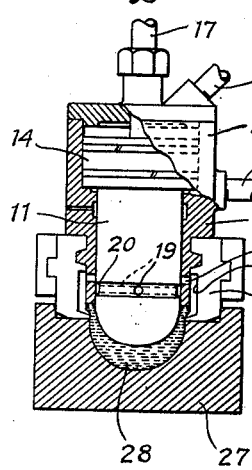 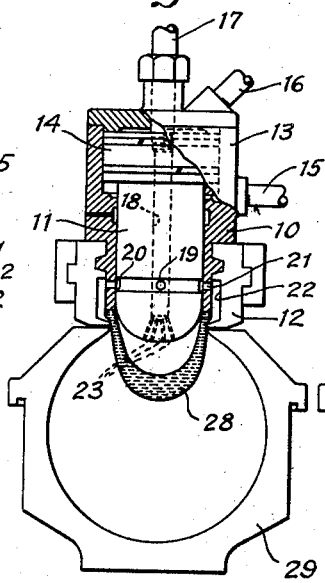 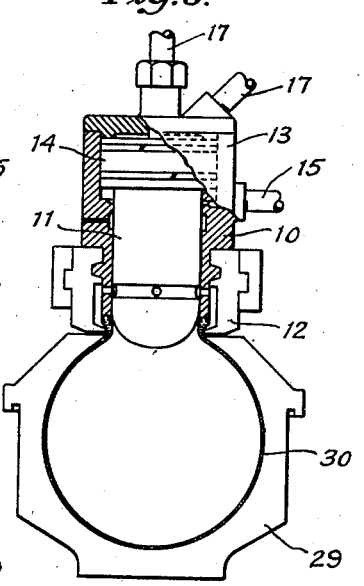
Witness:
A. A. Horn
Inventor:
George E. Rowe
by Brown + Parham
Attorneys.

Patented Dec. 24, 1940

2,226,504

UNITED STATES PATENT OFFICE 2,226,504

METHOD OF FORMING HOLLOW GLASS ARTICLES

George E. Rowe, Wethersfield, Conn., assignor to Hartford-Empire Company, Hartford, Conn., a corporation of Delaware Application February 23, 1938, Serial No. 191,982

2 Claims. (Cl. 49—80)

This invention relates to methods of forming hollow glass articles and more particularly to a method of forming hollow articles by steps or operations which include the gathering from the surface of a supply pool of molten glass of the charges or quotas of glass of which the articles are to be formed, severing the gathered charges or quotas from the glass of the supply pool, and thereafter blowing these charges or quotas of glass into final shape in final blow molds.

An object of the present invention is to provide in a method of the general character above referred to for improved control of the distribution of glass throughout the walls of the finally formed article.

A further object of the invention is to provide in a method of the general character above described for effective smoothing or ironing out of the glass that has been scarred and chilled by the severing operation.

According to the present invention, a charge or quota of glass that is to be formed into a particular article of the type above pointed out is gathered from a supply pool of molten glass in a neck ring around the lower end of a plunger, both of which are temporarily disposed at the surface of the supply pool of glass for the glass gathering operation. Suction may be employed in the neck ring and also at the end of the plunger, if desired, for the glass gathering operation. The plunger may depend below the neck ring so that the gathered glass, which is severed from the glass of the supply pool when the neck ring and plunger are lifted as a unit from the surface of the latter, will constitute a hollow blank or parison having at its bottom the glass that has been scarred and chilled by contact with and the action of the glass severing blades.

According to the present invention, the distribution of glass throughout the walls of the blank or parison and the shape and size of this parison are definitely and positively controlled by a pressing operation, which is effected by disposing the neck ring on a press mold and projecting the plunger downwardly through the neck ring and relatively to the walls of the cavity of the neck mold to press the gathered glass into a further hollow blank or parison of the shape and size desired. This pressing operation also smooths or irons out the glass that had contact with or was chilled by the shear blades.

The hollow blank or parison and the press mold then are separated while the former is supported by the neck ring. The neck ring and a final blow mold, which may be a paste mold, are brought into cooperative relation with each other, so that the blank or parison may be blown to final form in the blow mold. In this way, the distribution of glass throughout the walls of the final article is better controlled than in prior proposals and the glass that has been scarred and chilled by the severing operation will be smoothed or ironed out so as not to mar the appearance of the bottom of the article.

The invention and advantages thereof may be understood by the following description of a typical series of steps and operations, as illustrated in the accompanying drawing, which diagrammatically show apparatus which may be employed to perform the method to produce an article of glassware which, in the example shown in the drawing, is an electric light shade.

In the drawing:

Fig. 1 is a vertical sectional view, showing a glass gathering suction unit, including a neck ring and an associate pressing plunger, at a glass gathering position at the surface of a supply pool of molten glass;

Fig. 2 is a similar view, showing the suction unit in a raised position after a glass gathering operation and before the gathered glass has been severed from the glass of the supply pool;

Fig. 3 is a view showing the glass gathering unit and the gathered glass charge after the unit has been brought to a cooperative relationship with an upwardly facing blank or parison press mold;

Fig. 4 is a view similar to Fig. 3 but showing the pressing plunger in a projected, lowered position as required to press the body of the gathered glass charge against the wall of the cavity of the blank or parison press mold;

Fig. 5 is a view showing the pressed glass blank or parison supporting unit disposed on a blow mold with the body of the blank or parison depending within the blow mold; and Fig. 6 is a view similar to Fig. 5 after the body of the hollow glass blank or parison has been expanded by blowing pressure against the wall of the cavity of the blow mold.

Referring now to the drawing, I may make use of a glass gathering and forming unit or assembly comprising a tubular head 10 in which a pressing plunger 11 is mounted to slide axially, so that the lower end portion of this plunger is disposed within a partible neck ring 12. The neck ring 12, only one of the two cooperative parts of which is shown, is supported on the head 10 at the lower end thereof. A cylinder 13 is formed or provided at the upper end of the head 10. A piston 14 is reciprocable in this cylinder and supports the plunger 11 by being integral with or connected to the stem of the plunger in any suitable known way.

The piston may be moved to and held at the upper end of the cylinder 13, as shown in Figs. 1, 2, 3, 5, and 6, by fluid under pressure supplied to the cylinder beneath the piston, as from a pneumatic connection 15. A similar pneumatic connection 16 communicates with a cylinder above the piston for supplying air under pressure against the top of the cylinder to move the plunger downward to the position shown in Fig. 4, for example, for a purpose to be presently described.

The top of the cylinder 13 may be formed as a packing box about a vertically movable tube 17 which communicates with an axial bore 18 that is provided in the piston and the plunger 11. This bore 18 may have radial ports, such as indicated at 19, which establish communication between the bore 18 and an annular groove 20 in the periphery of the plunger 11. When the plunger is in its retracted or upper position, the groove 20 communicates with ports 21 in the side walls of the head 10 and these ports in turn communicate with suction passages or grooves 22 in the neck ring 12. Slits 23 also may be provided between the bottom of the bore 18 and the outer surface of the tip of the plunger. The tube 17 is adapted to supply subatmospheric pressure to the neck ring and to the slits 23, and also may have connections operable at appropriate times to shut off the subatmospheric pressure and apply superatmospheric or positive air pressure to the bore 18 and through the slits 23 for a purpose which will presently appear.

As shown in Figure 1, the glass gathering and forming assembly just described is disposed in glass gathering relation with the glass of a supply pool 24 and glass has moved upwardly through the latter into the neck ring around the plunger. It will, of course, be understood that suction has been applied to the glass at the lower end of the neck ring to effect this result and, as above explained, this suction may also be effective through the slits 23 on the glass directly beneath the plunger.

After the operation illustrated in Figure 1 has been effected, the glass gathering and forming unit may be raised from a position in the glass pool to the position shown in Figure 2, thereby raising from the supply pool a quota or charge of glass having the form of a hollow blank or parison, as indicated at 25. Metallic shear blades 26, representing any suitable severing mechanism, may be employed at this stage of the proceedings to sever the connecting glass between the gathered glass and the glass of the pool. This severing operation leaves chilled and scarred glass, as indicated at 25a in Fig. 3, at the bottom of the blank or parison 25.

The next step in the formation of the article of glassware desired, according to the present method, involves positive and definite formation of the hollow blank or parison 25 into a further blank or parison having walls of accurately controlled thickness and having the scarred or chilled glass 25a at the bottom of the blank or parison 25 smoothed or ironed out. To accomplish this desirable result, the glass gathering and forming unit and a press mold 27 are brought into cooperative relation with each other, so that the neck ring will rest on the top of the blank press mold and the gathered glass blank or parison 25 will depend into the cavity of such mold. Thereafter the piston 14 is actuated to move downward to press the glass blank or parison 25 against the walls of the press mold, thereby producing a hollow blank or parison 28 having walls of positively predetermined and controlled thickness and continuously smooth outer and inner surfaces.

As shown in Figure 5, the glass gathering and forming unit and the hollow glass blank or parison 28 carried thereby, which in the meantime has elongated slightly by gravity, and a final blow mold 29 are disposed in cooperative relation with each other, the neck ring resting on the blow mold. The plunger 11 has been lifted. Air under pressure may be applied through the pneumatic supply connections hereinbefore pointed out and the plunger to expand the hollow blank or parison 28 in the blow mold to form the final article 30, shown in Figure 6.

It will be observed that the walls of this article 30 are relatively thin and are of uniform thickness. The operation hereinbefore described of positively pressing the hollow blank or parison 28 temporarily sets or fixes the shape and size thereof and controls the distribution of glass throughout the walls thereof. This pressing operation also aids materially in producing continuously smooth outer and inner surfaces on the walls of the final article.

It is apparent that final blow molds and press molds of different shapes and sizes may be used selectively according to the particular requirements to be met at any given time, so that articles of different shapes and sizes and intended for specifically different purposes may be formed in substantially the same way and in accordance with the present invention.

Good results may be obtained by leaving the plunger 11 down after the pressing operation illustrated in Fig. 4 for the subsequent operations which have been described. The blow mold may be a paste mold and relative rotary motion between such mold and the glass therein may be effected in any suitable known way while the final blowing operation is being performed.

The relative movements and operations of the structural parts above referred to may be effected by the use of suitable timing and operating mechanisms of any preferred form and construction. As such mechanisms may be readily provided by those skilled in the art and do not per se form part of the present invention, no illustration or further description thereof is necessary herein.

The invention is not to be limited beyond the terms of the appended claims.

I claim:

1. The method of forming a hollow glass article comprising the steps of gathering glass to form the article from a supply pool in a neck ring at the surface of the pool about the end of a plunger which depends through the neck ring into the glass to be gathered so that the body of the gathered glass will be suspended in air out of contact with any glass chilling surface, severing the gathered glass from the glass in the supply pool, pressing the gathered glass to a definite predetermined hollow shape, while the rim portion of such gathered glass is supported in the neck ring, by the cooperative action of said plunger and the walls of the cavity of a press mold with which said neck ring is associated, disposing the neck ring and the pressed blank or parison supported thereby in cooperative relation with a final blow mold, so that the pressed blank or parison will depend within the blow mold, and blowing the pressed blank or parison to final shape in the blow mold.

2. The method of forming a hollow glass article comprising the steps of gathering glass to form the article from a supply pool in a neck ring at the surface of the pool about the end of a plunger which depends through the neck ring into the glass to be gathered so that the body of the gathered glass will be suspended in air out of contact with any glass chilling surface, separating the gathered glass from the glass in the supply pool, pressing the gathered glass to a definite predetermined hollow shape, while the rim portion of such gathered glass is supported in the neck ring, by the cooperative action of said plunger and the walls of the cavity of a press mold with which said neck ring is associated, disposing the neck ring and the pressed blank or parison supported thereby in cooperative relation with a final blow mold so that the pressed blank or parison will depend within the blow mold, and applying air under pressure through said plunger and neck ring to the interior of said pressed blank or parison in said blow mold to blow the glass of said pressed blank or parison to final shape in said blow mold.

GEORGE E. ROWE.